United States Patent [19]
Haley

[11] 3,831,773
[45] Aug. 27, 1974

[54] PORTABLE KNOCK-DOWN HOIST APPARATUS

[76] Inventor: Finley Paul Haley, 431 Zeta - Space 1235, Golden, Colo. 80401

[22] Filed: Feb. 12, 1973

[21] Appl. No.: 331,673

[52] U.S. Cl. ............................................. 212/139
[51] Int. Cl. .......................................... B66c 19/00
[58] Field of Search ......... 254/139.1; 212/134, 135, 212/139, 59 R, 115, 145

[56] References Cited
UNITED STATES PATENTS

| | | | |
|---|---|---|---|
| 1,978,999 | 10/1934 | Jones | 254/139.1 |
| 2,522,267 | 9/1950 | Hardin | 212/134 |
| 2,696,310 | 12/1954 | Milewski | 212/135 |
| 2,717,701 | 9/1955 | Pitman et al. | 212/59 R |
| 3,848,120 | 8/1958 | Harmon | 212/135 |

Primary Examiner—Robert B. Reeves
Assistant Examiner—Hadd Lane
Attorney, Agent, or Firm—Ancel W. Lewis, Jr.

[57] ABSTRACT

Portable knock-down hoist apparatus for use in readily removing and replacing truck transmissions and clutch assemblies without manual lifting or the use of a jack, has an elongated support beam positioned horizontally above the transmission across the ash and back of the seat, the beam being comprised of two telescoping tubular members separable from one another and a locking pin arrangement therefore to adjust the beam length to selected vehicle cab sizes. A channel section open along the bottom is associated with one of the tubular members and carries a depending trolley assembly which is attached via a chain hoist or the like to the truck transmission to suspend the transmission therefrom for a straight line horizontal movement along the vehicle.

9 Claims, 12 Drawing Figures

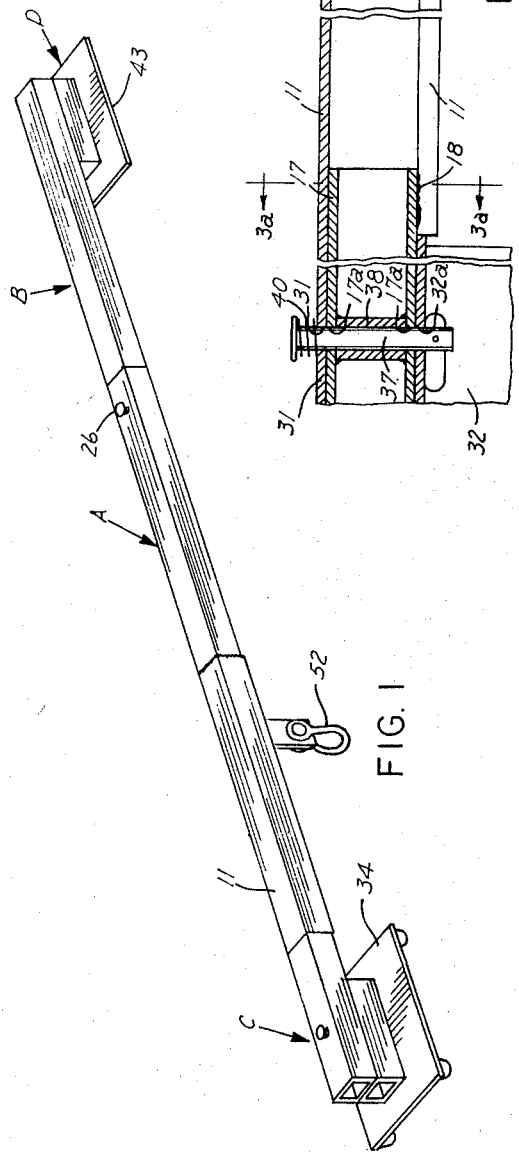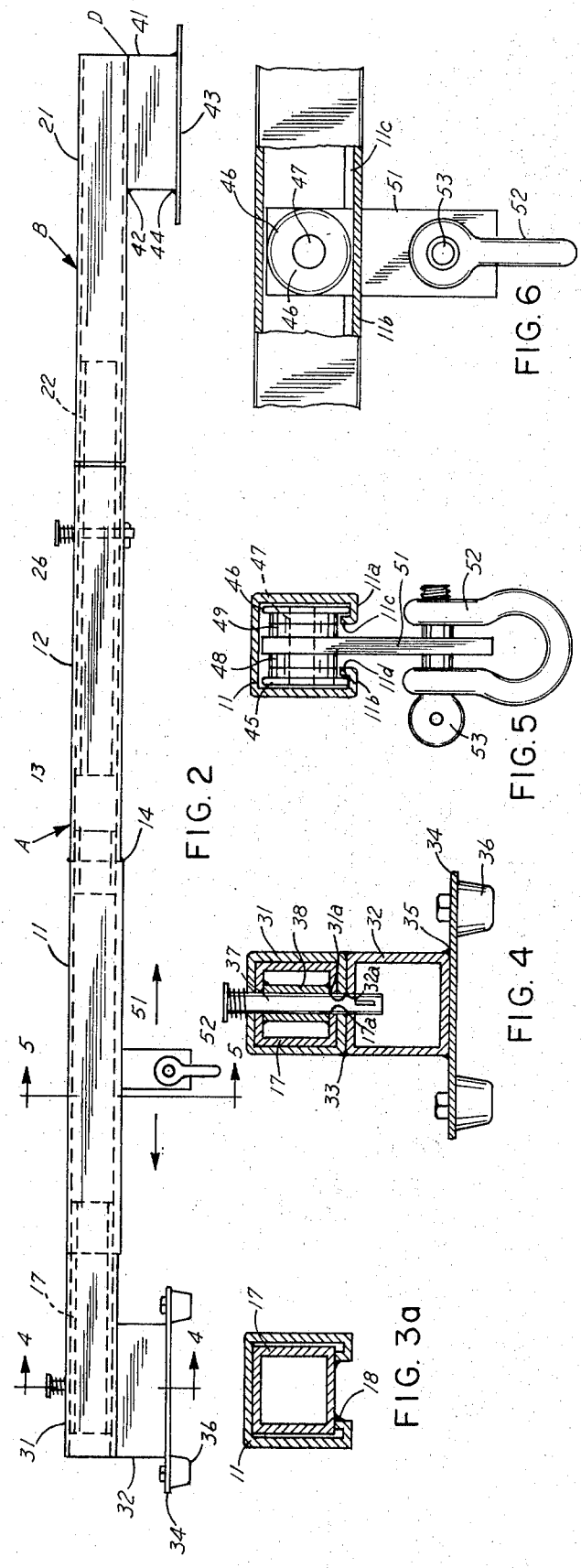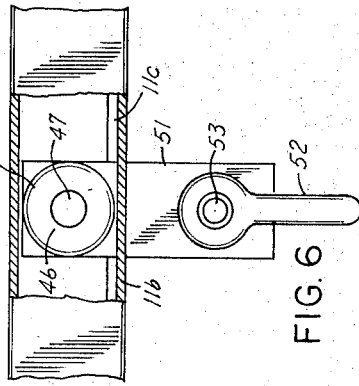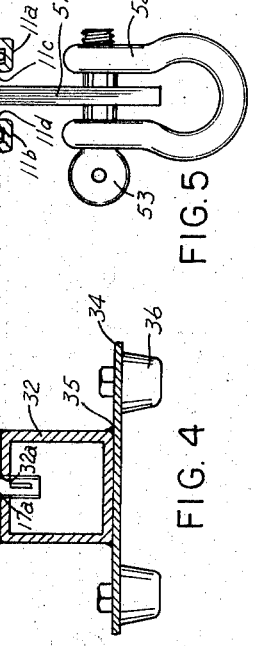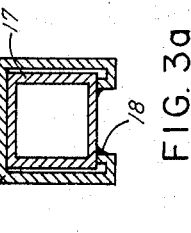

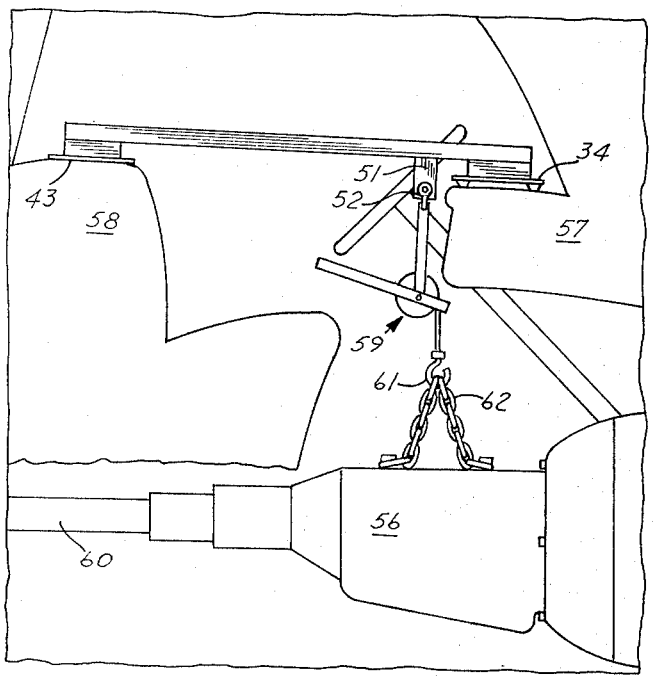
FIG. 7
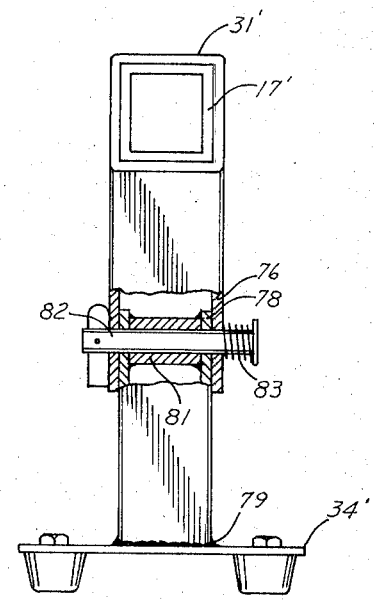
FIG. 10
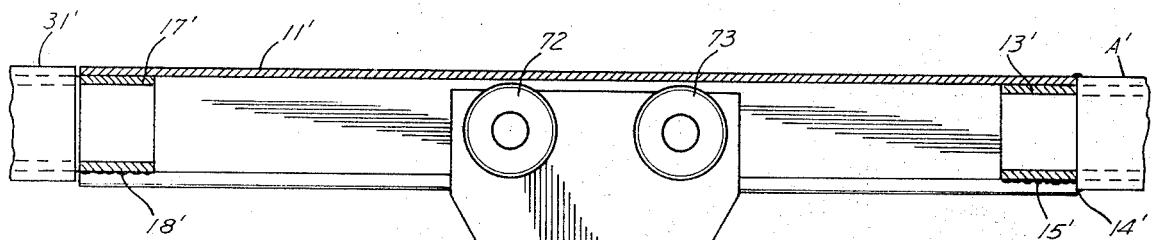
FIG. 8
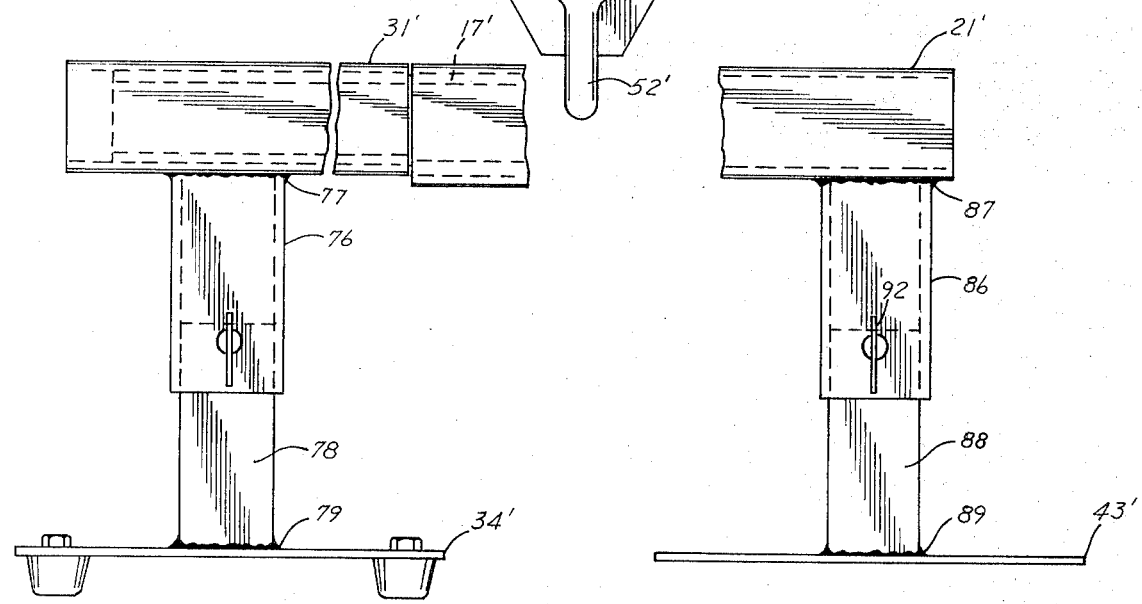
FIG. 9
FIG. 11

PORTABLE KNOCK-DOWN HOIST APPARATUS

BACKGROUND OF THE INVENTION

1. Field

This invention relates generally to vehicle repair tools and more particularly to a novel and improved hoist apparatus to facilitate the removal and replacement of transmissions and clutch assemblies without requiring a jack and without manual lifting.

2. Description of the Prior Art

The removal and replacement of clutches and transmissions has heretofore been relatively cumbersome particularly for one person due to the weight and location of the transmission and the necessity of moving it longitudinally of the vehicle in coaxial alignment with the engine and differential to remove and replace the clutch or transmission.

In the past, floor jacks have been placed under the transmission but difficulty is encountered in achieving the required straight line horizontal movement. Some attempts have been made to provide overhead hoist apparatus for this purpose but those heretofore known have not been entirely satisfactory because of their cumbersomeness and the multiplicity of parts required. Moreover, none of these hoist devices heretofore known have been constructed to be readily disassembled to the extent necessary to fit in most conventional tool boxes to be carried to the point of use.

Accordingly, it is an object of this invention to provide a novel portable knock-down hoist apparatus for use in repairing and/or replacing the transmission and clutch assemblies in trucks characterized by being relatively simple, lightweight, and inexpensive to manufacture, durable and readily adaptable to a wide variety of trucks.

Another object of this invention is to provide novel hoist apparatus for removing and replacing transmissions and clutch assemblies in a truck utilizing only a single overhead beam adjustable in length and provided with an inverted channel section carrying a depending trolley.

Still a further object of this invention is to provide a portable knock-down hoist apparatus characterized by being constructed almost entirely of relatively lightweight, strong metal tubing with telescoping parts and parts welded together for strength and with parts in releasable relation to one another to be assembled or broken down into several parts for storage and transport.

Yet another object of this invention is to provide novel hoist apparatus utilizing a horizontal beam with support pads at the ends adapted to be positioned across the dash and back of the seat of a truck cab.

SUMMARY OF THE INVENTION

In accordance with the preferred embodiments shown, there is provided a support beam comprised of two tubular telescoping members having a pin-type locking arrangement for selected lengths. An inverted channel section is attached to the end of one of the tubular members providing parallel tracks and carries a trolley rollable along the tracks and attachable to the transmission via a chain hoist or the like whereby when the transmission is disconnected from the vehicle, it may be slid in a guided straight line movement on a horizontal course of travel along the vehicle to readily release the transmission from and be refastened to the vehicle. The tubular members and channel section are metal stock, preferably steel, with some portions telescoped and welded into a durable single horizontal beam structure. In one form a single pair of rollers are provided on the trolley and in a second form two sets of pairs are used in a longer channel section. In a further modification, the beam has vertically adjustable legs between the support pads and beam.

DESCRIPTION OF THE DRAWINGS

Other objects, advantages and capabilities of the present invention will become more apparent as the description proceeds taken in conjunction with the accompanying drawings in which:

FIG. 1 is a perspective view of portable knock-down hoist apparatus embodying features of the present invention;

FIG. 2 is a side elevational view of the hoist apparatus of FIG. 1;

FIG. 3 is an enlarged longitudinal sectional view showing the joints of the parts of the hoist apparatus of FIGS. 1 and 2;

FIG. 3a is a sectional view taken along lines 3a—3a of FIG. 3.

FIG. 4 is a sectional view taken along lines 4 — 4 of FIG. 3;

FIG. 5 is a sectional view taken along lines 5 — 5 of FIG. 2;

FIG. 6 is a side elevational view of a fragment of the channel section showing the support of the trolley assembly therein;

FIG. 7 is a side elevation view of the hoist apparatus of FIGS. 1 - 6 in an operative position in a truck cab with the horizontal support beam being positioned across the back of the seat and dash of the vehicle above the transmission;

FIG. 8 is a sectional side elevation view of a fragment of the apparatus showing the details of the channel of another form of hoist apparatus suited for heavier loads;

FIG. 9 is a side elevation view of one adjustable leg of a vertically adjustable support pad;

FIG. 10 is an end elevation of the arrangement of FIG. 9 with portions broken away to show interior construction;

FIG. 11 is a side elevational view of the other vertically adjustable leg.

DESCRIPTION OF THE PREFERRED EMBODIMENTS

The portable knock-down hoist apparatus shown in FIGS. 1 - 7 includes an elongated support beam made up of two separable elongated tubular members A and B. Tubular member A has a generally square transverse cross section and has a channel section 11 affixed to one end thereof. The tubular member A is affixed to channel section 11 by means of an internal connector sleeve 13 telescoping within the abutting end portions of member A and section 11 and is affixed to the abutting end portions thereof. A weld connection 14 also secures section 11 and member A as is shown along the outer edge of members A and section 11 and a weld connection is shown connecting the sleeve 13 with section 11 and tubular member A at 15. Another tubular section 17 of generally square transverse cross section and of a reduced external size from channel section 11 has an end portion telescoping within channel section 11 and is affixed to channel section 11 with an internal weld represented at 18.

The tubular member B includes an outer tubular section 21 having the same shape and external dimension as tubular member A with a square transverse cross section. Tubular member B has a smaller inner tubular section 22 telescoped in an end portion of section 21 and projecting beyond the end thereof and into the tubular member A to provide the slidable telescoping connection between tubular members A and B and thereby facilitate the adjustment of the effective or combined length of members A and B so that the device will adjust to fit in truck cabs of different lengths and more specifically different spacing between the dash and back of the seat. The inner tubular section 22 is affixed to section 21 along the outside thereof by a weld represented at 23. Inner tubular section 22 has a series of apertures 24 located at spaced intervals along the length thereof which align with aperture 25 in tubular member A and receive a locking pin 26 as well as those locking pins hereinafter described, have a flattened head portion represented on pin 26 at 26a and a finger portion 26b at the opposite end which fits in a slot in the pin and pivots from a coaxially aligned position when inserted to a transverse locking position. A spring 28 fits between the head and tubular section 21 to bias the finger portion 26b against section 21.

A removable support pad assembly C is telescopically mounted over the inner tubular section 17. The support pad assembly C comprises an upper tubular section 31 affixed to a lower tubular section 32 with a weld represented at 33 together with a plate 34 affixed to the bottom of section 32 with a weld at 35, the plate 34 having resilient feet 36 mounted at each of the corners thereof. The support pad assembly C is releasably held in place by a locking pin 37. The inner tubular section 17 has a vertical sleeve 38 affixed therein with a weld in alignment with apertures 31a, 32a, and 17a in sections 31, 32 and 17, respectively, to facilitate the guiding of the finger portion of the pin therethrough and into lower tubular section 32 where it is moved to a transverse position against the bias of spring 40 to releasably hold the assembly C in place at the outer end of channel section 11.

A support pad assembly D is affixed to an end portion of tubular section 24 opposite support pad assembly C, the support assembly D being comprised of a tubular section 41 affixed to the bottom of tubular section 21 with a weld represented at 42 together with a flat plate 43 affixed to the bottom of a tubular section 41 by a weld represented at 44. In this way, plates 34 and 43 lie in a common plane parallel to the support beam.

The bottom of channel section 11 has inturned rail portions 11a and 11b which form a pair of internal tracks or track faces along the inside of the channel section 11 and then terminate in upturned termainal lip portions 11c and 11d, respectively. The channel section 11 is open along a longitutinal slot in the bottom. A pair of laterally spaced rollers 45 and 46 are carried on a common lateral shaft 47, the rollers being separated by laterally spaced collars 48 and 49 on a depending connecting plate 51 which projects downwardly to a point substantially below the track formed by the channel section 11. A clevis 52 is attached to the lower end portion of the connecting plate by a bolt 53 serving as a means for releasably attaching a chain hoist or the like to the trolley as described hereinafter.

In use, the support beam is adjusted in length by selecting a setting for pin 26 and is then positioned with the pads 36 on plate 34 resting on the dash 57 in the cab of the vehicle and the other pad 43 on the back of the vehicle seat 58. The floorboard of the vehicle is removed to provide access to the transmission. A conventional hand crank-type chain hoist 59 with depending hook 61 hooks into the loop formed by a chain 62 bolted to the top of the transmission. The weight of the transmission is transmitted to the beam by cranking the handle of the hoist and putting a tension on the chain hoist to suspend the transmission from the beam. The transmission is then unbolted at the front thereof and released from the universal joint 60 and slid rearwardly in coaxial alignment with the drive of the engine so that the engine may be lowered to the floor. In this way, the clutch assembly or transmission may be readily removed and replaced without a jack or manual lifting by the mechanic. When not in use locking pins 26 and 37 are removed and the members (A,11), B and C may be separated from one another and will fit in a conventional tool box or like carrying case to be taken to the next point of use.

In a modified form of trolley shown in FIG. 8 and a modified support pad assembly shown in FIGS. 9 – 11 corresponding parts comparable to the structure to those described with reference to FIG. 1 – 7 bear the additional designation of a prim ('). In the trolley shown in FIG. 8, there is provided a channel section 11' of greater length than section 11 above described but similar in transverse cross sectional shape. A double pair or two sets of pairs of rollers 72 and 73 are spaced longitudinally from one another along the channel section 11 and are mounted on the upper end of a depending triangular shaped connecting plate 74 to which is attached the clevis 52'. The additional pair of rollers facilitates the removal and repair of transmissions having greater weights.

For those truck-type vehicles in which the dash and back of the seat are at different elevations, the support pad assemblies may be vertically adjustable as shown in FIGS. 9 – 12'. At the end of the beam which seats on the dash, a depending outer leg 76 is affixed to end section 31' with a weld at 77 and an upstanding inner leg 78 is telescopically received in leg 76 and is affixed to the plate 34' with a weld at 79. An internal sleeve 81 is aligned with aligned apertures in the telescoping legs to receive a locking pin 82 biased by a spring 83. In this way, when the locking pin 82 is removed, the outer leg section will fit down against the plate 34'. With reference to FIG. 11, the end of the beam which seats on the back of the seat of the vehicle has a similar adjustable vertical leg arrangement with a depending outer leg 86 affixed to end section 21' with a weld at 87 and an upstanding inner leg 88 telescopically received in leg 86 and is affixed to the plate 43' with a weld at 89. The outer and inner legs have aligned apertures and an internal sleeve as with the other telescoping legs and receive a locking pin 92 in the locking position biased by a spring (not shown).

By way of illustration and example and not by way of limitation, hoist apparatus described above with reference to FIG. 1 – 7 may have the following dimensions:

Tubular member A     length    14"

|                    | -Continued |        |
|--------------------|------------|--------|
|                    | width      | 1½"    |
| Tubular member B   | length     | 12"    |
|                    | width      | 1½"    |
| Tubular section 21 | length     | 14"    |
|                    | width      | 1½"    |
| Tubular section 22 | length     | 14"    |
|                    | width      | 1½"    |
| Tubular section 13 | length     | 3½"    |
|                    | width      | 1¼"    |
| Tubular section 17 | length     | 6"     |
|                    | width      | 1¼"    |
| Channel section 11 | length     | 12"    |
|                    | width      | 1½"    |

The modified form shown in FIG. 8 has a channel section length of 14 inches.

Although the present invention has been described with a certain degree of particularity, it is understood that the present disclosure has been made by way of example and that changes in details of structure may be made without departing from the spirit thereof.

What is claimed is:

1. In portable knock-down hoist apparatus for use in removing and replacing a transmission and clutch assembly in a truck having a cab and the like, the combination comprising:
    an elongated support beam including first and second tubular members, said second tubular member having an inner tubular section and an outer tubular section, said inner tubular section being received in telescoping relation in said outer tubular section and affixed thereto, said inner tubular section being received in slidable telescoping relation to said first tubular member to adjust the combined length of said first and second tubular members, locking means to releasably lock the tubular members at one of selected telescoping positions;
    said first tubular member having an inverted channel section affixed to an end thereof opposite said inner tubular section having a pair of inturned inner end portions forming two parallel tracks inside the channel section separated by a bottom slot, a connecting sleeve telescoping inside adjacent end portions of said first tubular member and said channel section and fixedly secured thereto, a second inner tubular section telescoping inside said channel section opposite said connecting sleeve and fixedly secured thereto and projecting beyond the end of the channel section;
    a first support pad removably attached to the support beam including a first upper tubular section telescoping over and separable from said second inner tubular section a first lower spacing tubular section affixed to the bottom of said first upper tubular section and a first lower flat support plate affixed to the bottom of said first lower spacing tubular section and arranged parallel and spaced below the longitudinal axis of the support beam;
    means releasably locking said first upper tubular section of the support pad on said second inner tubular section;
    a second support pad affixed to the end of said second tubular member including a second lower spacing tubular section affixed to the bottom of said second tubular member and a second lower flat support plate affixed to the bottom of said second lower spacing tubular section and arranged parallel and spaced from the longitudinal axis of the support beam, said first and second support plates being adapted to seat on the dash and back of the seat of said vehicle cab;
    a trolley including roller means positioned for movement over the tracks and having a depending connector extending down through the bottom slot having means adapted to attach to the transmission whereby the transmission will be suspended therefrom and slide in a straight line generally horizontal to the course of travel along the truck.

2. In portable knock-down hoist apparatus as set forth in claim 1 wherein said first tubular member, said inner and outer tubular sections, said connecting sleeve, said channel section, said second inner tubular section, making up the support beam are made of metal stock and have a generally square transverse cross section.

3. In portable knock-down hoist apparatus as set forth in claim 1 wherein said locking means to releasably lock the tubular members is in the form of a pin which extends through selected aligned apertures in the telescoping sections of the tubular members.

4. In portable knock-down hoist apparatus as set forth in claim 1 wherein said trolley includes a pair of laterally spaced rollers rollable over said tracks, a depending plate, and a fastener attached to the lower end of said plate.

5. In portable knock-down hoist apparatus as set forth in claim 1 wherein said trolley includes two pair of laterally spaced rollers, said pairs being spaced from one another along the channel section and rollable over the tracks, a depending plate attached to the rollers and a fastener attached to the plate.

6. In portable knock-down hoist apparatus as set forth in claim 1 wherein each of said first and second lower spacing tubular sections are made up of two telescoping parts at a selected telescoping position for vertical adjustment of the relation of the end of the beam to the associated support plates.

7. In portable knock-down apparatus as set forth in claim 1 including a chain hoist coupled between said depending connector and the transmission of the vehicle to take up the slack in the coupling between the support beam and transmission.

8. In portable knock-down hoist apparatus as set forth in claim 1 wherein said first and second support plates have resilient feet affixed to the bottom thereof.

9. In portable knock-down hoist apparatus for use in removing and replacing a transmission and clutch assembly in a truck vehicle having a dash and a front seat, the combination comprising:
    an elongated support beam including first and second tubular members, said second tubular member having an inner tubular section and an outer tubular section, said inner tubular section welded to said outer tubular section and received in slidable telescoping relation to the first tubular member to adjust the combined length of said first and second tubular members, said inner tubular section having a plurality of apertures extending longitudinally thereof and said first tubular member having an aperture which aligns with one of said plurality of apertures;

a first locking pin releasably inserted in said aligned apertures to lock said first and second tubular members at one of several selected telescoping positions;

an inverted channel section welded to an end of said first tubular member, said channel section having a pair of inturned lower end portions terminating in upturned terminal portions, with said inturned lower end portions forming two parallel tracks inside the channel section separated by a bottom slot, a connecting sleeve telescoping inside adjacent end portions of said first tubular member and said channel section and welded thereto to join said first tubular member and said channel section, said channel section having a second inner tubular section welded inside thereof and projecting beyond the end thereof;

a first support pad including a first support plate arranged parallel to the longitudinal axis of the support beam adapted to seat in the dash having a first upper tubular section telescoping over said second inner tubular section and a first lower spacing tubular section welded to the bottom of said first upper tubular section;

a second locking pin releasably holding the first upper tubular section of the support pad to said second inner tubular section;

a second support pad including a second support plate arranged parallel to the longitudinal axis of the support beam welded to the bottom of a second lower spacing tubular section at the end of said second member adapted to seat on the back of the vehicle seat;

a trolley assembly carried by the channel section including a pair of laterally spaced rollers mounted for movement over the tracks, a depending plate projecting downwardly from the rollers through the bottom slot and a clevis attached to the plate; and a chain-type hoist connected between the clevis and transmission to suspend the transmission from the beam whereby the transmission will slide in a straight line longitudinal course of travel along the truck.

* * * * *

PO-1050
(5/69)

UNITED STATES PATENT OFFICE
CERTIFICATE OF CORRECTION

Patent No. 3,831,773                Dated August 27, 1974

Inventor(s) Finley Paul Haley

It is certified that error appears in the above-identified patent and that said Letters Patent are hereby corrected as shown below:

In the Abstract, line 5, delete "ash" and insert ---dash---.

Signed and sealed this 3rd day of December 1974.

(SEAL)
Attest:

McCOY M. GIBSON JR.
Attesting Officer

C. MARSHALL DANN
Commissioner of Patents